United States Patent [19]

Sexton, I

[11] Patent Number: 4,934,024
[45] Date of Patent: Jun. 19, 1990

[54] THERMOPLASTIC GRIP AND METHOD FOR MAKING SAME

[75] Inventor: Vernon R. Sexton, I, Yale, Mich.

[73] Assignees: Debra A. Sullivan; John W. Boukamp, both of Port Huron, Mich.

[21] Appl. No.: 331,273

[22] Filed: Mar. 30, 1989

Related U.S. Application Data

[63] Continuation-in-part of Ser. No. 52,244, May 19, 1987, abandoned.

[51] Int. Cl.⁵ .................... B29C 33/40; B29C 71/02; A63B 53/14
[52] U.S. Cl. .......................... 16/111 R; 16/DIG. 12; 74/551.9; 264/222; 264/322; 264/DIG. 30; 81/489; 273/75; 273/81.4
[58] Field of Search .... 16/110 R, DIG. 12, DIG. 19, 16/111 R, 116 A, 116 R; 273/75, 81 R, 81.4, 81 B, 81 D, 165; 264/322, 222, DIG. 30; 74/551.9; 272/68; 81/489

[56] References Cited

U.S. PATENT DOCUMENTS

| | | | |
|---|---|---|---|
| 412,479 | 10/1889 | Davis | 264/DIG. 30 |
| 1,668,716 | 5/1928 | Herdman et al. | |
| 1,980,655 | 11/1934 | Balistreri | |
| 2,121,718 | 6/1938 | Sweetland | 264/DIG. 30 |
| 2,205,769 | 6/1940 | Sweetland | 273/81.4 |
| 2,235,313 | 3/1941 | Cleveland | |
| 3,312,218 | 4/1967 | Jacobs | |
| 3,993,403 | 11/1976 | Brown | |
| 4,277,063 | 7/1981 | Parrone et al. | |
| 4,509,228 | 4/1985 | Landsburger | |
| 4,582,459 | 4/1986 | Benit | 51/100 R |
| 4,617,697 | 10/1986 | David | |
| 4,651,461 | 3/1987 | Williams | 43/22 |
| 4,696,842 | 9/1987 | Doubt | 273/75 |
| 4,719,063 | 1/1988 | White | 264/222 |
| 4,765,856 | 8/1988 | Doubt | 264/DIG. 30 |
| 4,785,495 | 11/1988 | Dellis | 16/DIG. 12 |

FOREIGN PATENT DOCUMENTS

| | | | |
|---|---|---|---|
| 2302271 | 7/1973 | Fed. Rep. of Germany | 273/75 |
| 2815884 | 10/1979 | Fed. Rep. of Germany | 273/75 |
| 3602636 | 4/1987 | Fed. Rep. of Germany | 273/75 |
| 2169541 | 7/1986 | United Kingdom | 273/73 J |
| 2192550 | 1/1988 | United Kingdom | 273/81 R |

OTHER PUBLICATIONS

Material Safety Data Sheet VAX001 (Oct. 20, 1986).
Elvax Resins for Molding, Compounding, & Extrusion Guide, a Grade Selection Guide Brochure E-54895 (6/86).
Elvax Resins Industrial Extrusions Manual Brochure E-50029 (Undated).
Dionne, "Carpal Tunnel Syndrome Part I-The Problem", Mar. 1984, National Safety News.
Kulick et al, "Long-Term Analysis of Patients Having Surgical Treatment for Carpal Tunnel Syndrome", *The Journal of Hand Surgery*, pp. 59-66.
Armstrong et al, "Carpal Tunnel Syndrome and Selected Personal Attributes", Journal of Occupational Medicine/vol. 21, No. 7/Jul. 1979.
Sebright, "Gloves, Behavior Changes Can Reduce Car- (List continued on next page.)

*Primary Examiner*—Nicholas P. Godici
*Assistant Examiner*—Edward Brown
*Attorney, Agent, or Firm*—Harness, Dickey & Pierce

[57] ABSTRACT

The grip is comprised of a deformable cover formed of a thermoplastic material which is stable and semi-rigid at normal ambient temperatures and is soft and deformable when heated in boiling water. The cover is attached to an implement handle heated and deformed to the shape required by a specific implement user. The method of forming the grip includes the steps of coating the implement handle with a cover material, heating the implement handle until the material has become softened, and grasping an implement handle while the cover is soft and deformable, thereby causing the cover to be molded to a user's specific shape. The high coefficient of friction and the moldability of the material results in a superior grip.

25 Claims, 2 Drawing Sheets

OTHER PUBLICATIONS pal Tunnel Syndrome", Occupational Health & Safety (undated).

Lahey, "Bearing Down on Musculoskeletal Disorders", Mar. 1984, National Safety News.

Cohen, "Trends in Human Factors Research", Occupational Health and Safety, Jun. 1982.

Johnson, "Congressional Testimony of Barry L. Johnson Before the Subcommittee on Postal Personnel and Modernization", Jun. 1984.

Silverstein et al, "Carpal Tunnel Syndrome: Causes and a Preventive Strategy", Seminars in Occupational Medicine, vol. 1, No. 3, Sep. 1986.

Frederick, "An Introduction to the Principles of Occupational Ergonomics", Occupational Health Nursing, Dec. 1984.

Silverstein et al, "Occupational Factors and Carpal Tunnel Syndrome", Occupational Factors and Carpal Tunnel Syndrome, 1987.

Armstrong et al, "Repetitive Trauma Disorders: Job Evaluation and Design", Human Factors, 1986, 28(3), 325–336.

Armstrong, "Ergonomics and Cumulative Trauma Disorders", Occupational Injuries, Aug. 1986.

Armstrong et al, "Investigation of Cumulative Trauma Disorders in a Poultry Processing Plant", American Industrial Hygiene Association Journal, Feb. 1982.

Buchholz et al, "An Investigation of Human Palmar Skin Friction and the Effects of Material, Pinch Force and Moisture".

Armstrong, "Ergonomics Guides", American Industrial Hygiene Association, 1983.

"Proposed National Strategies for the Prevention of Leading Work-Related Diseases and Injuries", The Association of Schools of Public Health, 1986.

"Vibration Syndrome", NIOSH, Mar. 29, 1983.

Brochure for Center for Occupational Health and Safety Engineering (undated).

Brochure for Ergonomics and Safety Research and Education Programs (undated).

"Ergonomics Affiliates Program", The University of Michigan, Center for Ergonomics.

"Occupational Health and Safety Engineering", Graduate Programs University of Michigan.

"Tasks Human Hardware", Center for Ergonomics, The University of Michigan.

Bernard, "Carpal Tunnel Syndrome: Identification and Control", Twenty-Seventh Annual AAOHN Presidents' Meeting, Sep. 22 & 23, 1979.

"Cumulative Trauma Disorders", A Manual for Musculoskeletal Diseases of the Upper Limbs, 1988.

"Human Engineering Design Criteria for Military Systems, Equipment and Facilities", MIL-STD-1472C, May 2, 1981.

Foulke, letter dated May 19, 1988 from the University of Michigan.

Lifshitz et al, "Effect of Handle Curving and Shaping on Peak Exertion Capabilities", Center for Ergonomics, U of M, Dec. 5, 1988.

Foulke, letter dated Mar. 20, 1989 from U of Michigan.

Breuer, letter dated Feb. 17, 1987.

"Work Recovery", National Easter Seal Society, vol. 2, No. 2, Fall 1988.

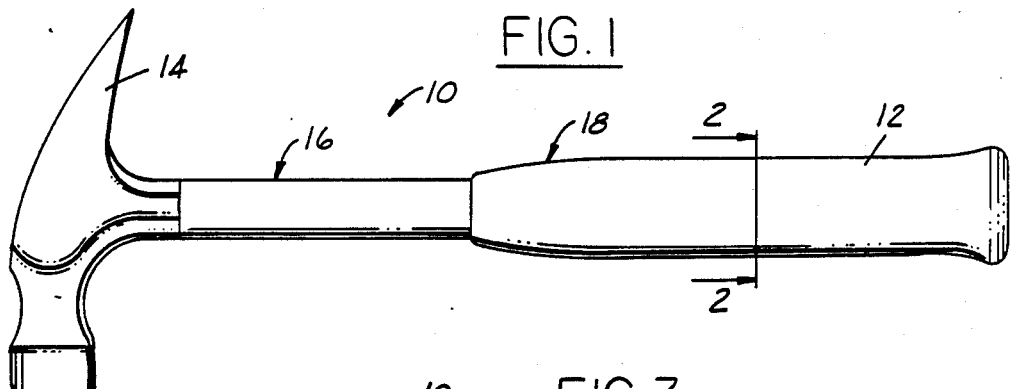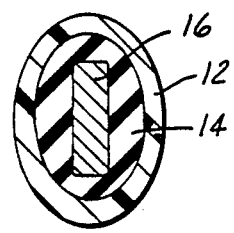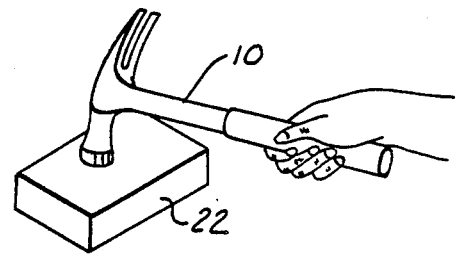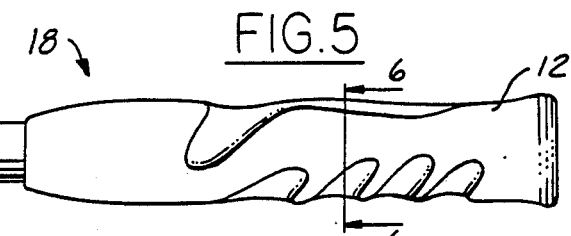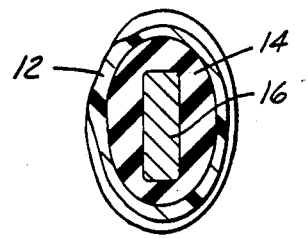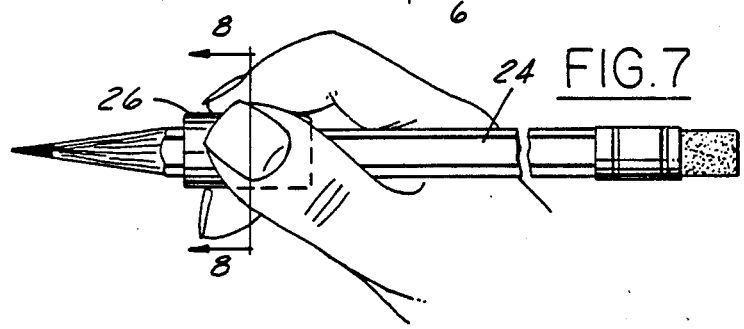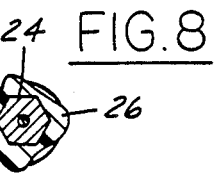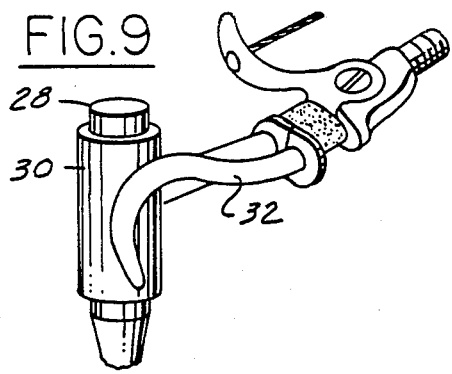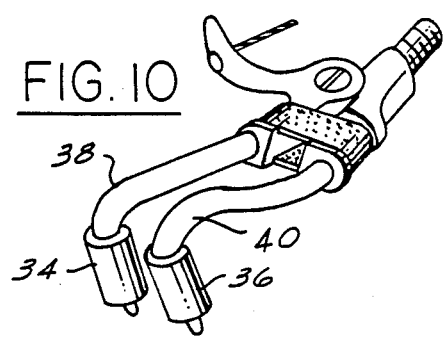

THERMOPLASTIC GRIP AND METHOD FOR MAKING SAME

CROSS REFERENCE TO RELATED APPLICATION

This is a continuation-in-part application of U.S. Ser. No. 07/052,244 filed May 19, 1987, now abandoned, entitled "Moldable Handle Grip and Method for Making Same" by Sexton.

BACKGROUND OF THE INVENTION

1. Field of Invention

This invention relates to the field of handle grips, and more specifically to grips for implements which are moldable to conform to a specific shape.

2. Discussion

There are numerous implements and other devices provided with handles to be grasped by the user. Typically, handles are designed to provide a reasonable fit to a wide variety of users' hands. On occasion, the product marketed to the public will be provided with a somewhat contoured handle or grip, such as is the case with utility knives and ski pole handles. Due to the wide range of hand sizes, the grip shape is, at best, a poor compromise for anyone other than a person with a hand size which is very near average. To enable an implement handle to conform to the shape of the user's hand, a number of approaches have been tried. Namely, to cover the handle with a soft foam-like material so that it can temporarily deform to the desired shape during usage. Another approach is to mold the handle in place to correspond to the shape of the specific user's hand. This type of device is shown in U.S. Pat. No. 4,617,697 to David which utilizes a bladder-like pouch into which a two part curable material is placed. During curing, the user grasps the handle, which is permanently formed to match the contour of the specific user's hand. U.S. Pat. No. 412,479 to Davis suggests the use of two grades of dental vulcanite material: a softer grade for the interior and a harder grade for the exterior.

Both of the deformable handles discussed above have their drawbacks. The foam type handles invariable result in some loss of the control the user has over the implement, due to handle deformation. Furthermore, the handle will not significantly deform unless the material is quite soft which in turn, amplifies the control problem, and results in high handle wear. The moldable handles, of the type shown in U.S. Pat. No. 4,617,697 tend to be complicated, useful only in a limited range of specifically shaped handles which correspond to the dimensions of the bladder and cannot be remolded to accommodate a different user, while the harder dental vulcanite material suggested by the '479 Davis patent appears to be too slippery for the intended purpose of this invention.

Implement handle and grip designs are of a particular concern to individuals with prosthetic hands or impaired gripping ability. Common implements which are used frequently, such as a knife, a wrench or even a key, can be difficult to grasp by an individual with severe arthritis or a prosthetic hook. U.S. Pat. No. 4,509,228 to Landsburger discloses an inflatable implement handle specifically designed for those with impaired gripping ability, however, the device is useful on a very limited number of utensils.

Many studies have been conducted on an ailment known as carpal tunnel syndrome which falls within the broader category of cumulative trauma disorders. Carpal tunnel syndrome is often encountered by workers whose job entails the everyday use of grasping and manipulating hand tools. While the studies have pinpointed the cause of carpal tunnel syndrome, there has been no totally satisfactory solution to this problem suggested by the prior art.

It is therefore an object of the invention is to provide a grip to be used on an implement handle to enable individuals with impaired hand strength, as well as persons with prosthetic limbs, to conveniently grasp an implement.

Another object of the invention is to provide a grip which can be easily installed upon a wide variety of existing implements.

A feature of the present invention is that the grip can be easily molded to the shape desired by the user, increasing the grip surface area to exactly fit the user's hand.

Another feature of the present invention is that the contour of the grip can be easily changed to accommodate a different user, or a user who acquires a different prosthetic device.

An advantage of the present invention is that it is relatively easy to fabricate, and therefore, inexpensive, making the device practical for a wide variety of individuals with impaired gripping ability.

These advantages, as well as other features of the invention, are more fully described and shown in the accompanying drawings and description of the preferred embodiment.

SUMMARY OF THE INVENTION

Accordingly, a grip of the present invention is provided by a moldable thermoplastic material having a high coefficient of friction resulting in a superior grip. The material is utilized with an implement having a handle to be grasped by the user, comprises a deformable cover formed of a thermoplastic material which is stable and semi-rigid at normal ambient temperatures and becomes soft and deformable when heated in boiling water. The cover is attached to the implement handle forming a gripping surface which can be readily molded to the shape necessary to accommodate a specific user. The invention further includes a method for forming a grip for an implement handle which includes the steps of coating the implement handle with a layer of thermoplastic material which is semi-rigid at ambient temperatures, and soft and deformable when heated in boiling water, heating the material to render it soft and pliable, and grasping the material during the cooling process, deforming the material to the specific shape required by the user. Preferably, the implement will be moved through a typical cyclic motion during cooling so that the contour of the grip will not impair implement mobility.

It is a feature of this invention that the thermoplastic material is provided in the form of a spiral cut tube to facilitate wrapping the material around the implement. The material is heated, molded and cooled to provide a grip for the implement that is shaped to an individual user. If an implement needs to be used by different persons, the grip can be cut, unwrapped from the implement, and reinstalled as necessary.

In accordance with another feature of this invention, the moldable thermoplastic material is provided on a structure that acts as a temporary carrier. Preferably, the carrier is in the shape of the implement on which the grip is to be ultimately used. The grip can be molded while remaining on the temporary carrier and later removed from the carrier and inserted on the implement.

BRIEF DESCRIPTION OF THE DRAWINGS

Various other advantages of the present invention will become apparent to those skilled in the art after studying the following specification and by reference to the drawings in which:

FIG. 1 is a side elevation of a handle fabricated according to the present invention;

FIG. 2 is a cross-sectional view taken along line 2—2 of FIG. 1;

FIG. 3 is a perspective view of a hammer handle being heated in boiling water;

FIG. 4 is a perspective view of a user grasping a hammer handle and striking a block;

FIG. 5 is an enlarged partial view of a hammer handle molded to conform to a specific shape of a user's hand;

FIG. 6 is a cross-sectional view taken along line 6—6 of FIG. 5;

FIG. 7 is a side elevation of a pencil equipped with a grip made in accordance with the present invention;

FIG. 8 is a cross-sectional view of the pencil in FIG. 7 taken along line 7—7;

FIG. 9 is a perspective view of a punch being held by a prosthetic hook;

FIG. 10 is a perspective view of a prosthetic hook fitted with a pair of moldable grips;

DETAILED DESCRIPTION OF THE PREFERRED EMBODIMENT

Figure 11:
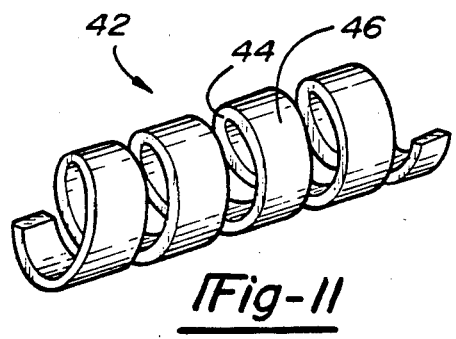
FIG. 11 is a perspective view of the thermoplastic material in the form of a spiral cut tube.

Several preferred embodiments of the present invention are illustrated by way of example in FIGS. 1-10. With specific reference to FIGS. 1-5, a hammer 10 is shown provided with a handle gripping surface 12 made in accordance with the present invention. Hammer 10 is shown provided with a handle gripping surface 12 made in accordance with the present invention. Hammer 10 in FIG. 1 is of the type typically used by carpenters, and is generally provided with a head 11, a shank 16 and a handle 18. The structure of the handle is shown in cross section in FIG. 2. Shank 16 extends centrally through the handle and is surrounded by a rigid plastic body 14. The outer periphery of the handle is covered by grip member 12. Grip member 12 is formed of a thermoplastic material which is stable and relatively rigid at normal ambient temperatures, but becomes soft and deformable upon heating in boiling water. The deformable cover which forms grip 12 is uniformly distributed about the entire length and periphery of the handle region of the hammer. The deformable cover forming the grip may be installed on the hammer handle originally by the hammer manufacturer using a molding technique, or the material can be subsequently added by the user, who would cut and bond a sheet of grip cover material to the periphery of the handle.

The material forming the grip cover, in addition to having the desired thermoplastic characteristics, must be capable of being securely bonded to an implement handle and preferably provides a good coefficient of friction between the grip or outer cover surface and the user. The cover material should be semi-rigid having a stiffness in the 800-14,000 psi range. if the material is too soft, it will have poor durability. If the material is too hard, the coefficient of friction and the resulting gripping power will be reduced, particularly when used in conjunction with a metallic mechanical hand. It should also be moldable at temperatures which will not burn the human hand, preferably 130-180° F., more particularly about 160° F. A preferred material which exhibits all of the above desired characteristics is Elvax 250 Resin, which is made by E.I. duPont De Nemours and Co. (Inc.) of Wilmington, Del. This resin is an Ethylene/Vinyl Acetate Copolymer $[(CH_2\text{-}CH_2)_x CH_2CHOCHOCH_3)_y]_n$, which is described in more detail in the duPont Product Brochures: Material Safety Data Sheet VAX001 (Oct. 20, 1986), Elvax Resins for Molding, Compounding, and Extrusion Guide a Grade Selection Guide, Brochure E-54895 (6/86), and Elvax Resins Industrial Extrusions Manual Brochure E-50029 (Undated), all of which are incorporated by reference herein. While other thermoplastic materials may work equally as well, initial testing with the Elvax material has demonstrated excellent molding characteristics, product durability and coefficient of friction.

It has come to the inventor's attention that Elvax resin has been used in the past as a mouth protector, see, e.g. U.S. Pat. No. 3,312,218 to Jacobs. It is believed, however, that the mouth guard is formed by an injection molding process which by necessity generally employs mold release agents and the like which make the mouth guard relatively slippery. In contrast, the preferred method of providing the moldable thermoplastic material of the present invention is to extrude, as compared to injection mold, the material substantially free of mold release agents or other additives which would cause the material to exhibit slippery characteristics, as compared to the high friction characteristics desired of the grip of the present invention. Preferably, the material consists essentially of 100% pure Elvax resin except for the addition of a colorant such as FD&C blue No. 1 lake concentrate.

In order to form a grip in accordance with the present invention, one first must provide a handle of an implement to be grasped by the user and a grip cover surface thereon formed of a thermoplastic material which is stable and semi-rigid at normal ambient temperatures, and is soft and deformable when heated in boiling water. The material is then heated in a pot of boiling water 20 or the like until the cover has become soft. The handle is then removed from the water and the material grasped by the user, deforming the cover material and molding same to the specific contour of the user. Most often, the material will be molded to a user's hand, however, it is important to note that this invention particularly lends itself to molding grips to be specifically held by prosthetic hands or hooks. The user holds the grip for a short time until the grip is cooled sufficiently to become somewhat rigid, taking on the desired shape. Preferably, the method of forming the grip also includes the step of moving the implement during the cooling process through a cyclic motion which is typical of the particular implement. Moving the implement insures that in the event the user's grip naturally changes during usage, the molded grip will accommodate a complete range of travel without hindering the implement's usage. With reference to the drawings, FIG. 3 shown a hammer having its handle and cover material thereon heated in a pot 20 of boiling water. FIG. 4 shows a user grasping the handle after being removed from the boiling water to form the grip to the specific shape of the user's hand. The hammer is being moved through a normal cycle which, in the case of the hammer, is the striking of an object depicted by block 22.

The completed handle, whose cover has been molded to the shape of a user's hand, is shown in FIG. 5. The user's finger, thumb and palm have made indentations in the cover and the material has been extruded outward around the peripheral edges of the indentations as shown. As can be seen in FIG. 6, a cross-sectional view of FIG. 5 taken along the line 6—6, the thickness of the cover 12 after molding is no longer uniform. The preferred EVA material is essentially noncompressible. As such, portions of the material in contact with the hand will be indented beneath the original surface of the material while other portions adjacent the fingers, thumb and palm will rise up about the original surface and provide peaks 66 (see, e.g. FIG. 16) which enhance the mechanical intervention of the grip. It also increases the surface area of the material in contact with the hand, as well as increasing leverage.

When the user is required to install the deformable grip cover to a conventional implement, as opposed to buying an implement with a cover provided, it becomes necessary to install the cover prior to beginning the steps of molding the grip to fit the specific user as outlined above. Using a hammer as an example, one again, to make a cover to fit the handle, the user must first determine the approximate size of material necessary. This can be estimated from a visual inspection of the handle or a simple paper template may be made to determine the size of the cover sheet material necessary to completely surround the handle periphery and length. With the size of the cover material determined, a thin, flat sheet of cover material is then cut using a knife, shear, saw or the like to the desired shape. The cover material is then heated in boiling water until it has become soft and pliable. An adhesive, such as an ethylene/vinyl acetate, a rubber base tile adhesive or the like, can be applied, if necessary, to the hammer handle surface. The cover is then removed from the boiling water and blotted dry with a towel. Then the cover is draped about the hammer handle and gently formed to the desired shape. At this time, it is preferred that the grip not be molded to the contour of the user. If the cover material does not fit quite right, it can be easily stretched or compressed prior to cooling, or even trimmed after cooling. After the grip material is cooled, and enough time has been allowed to enable the adhesive to bond the cover material to the handle, the handle is then reheated and molded to the desired shape in the manner previously described.

It should be noted that a hammer handle is used merely for illustrative purposes, and that a wide variety of implements can be equipped with a handle grip of the present invention. It should also be noted that a handle can be designed to accommodate two hands, such as a golf club or a baseball bat. Other implements which may be equipped with deformable handles include; power tools, hand tools, door knobs, keys, guns, and a wide variety of household items.

While turning a door knob or using a key may not be a problem for most people, for those impaired with severe arthritis or other debilitating disease, a simple door knob or lock and key can be a major obstacle. Since it is not practical in most instances to insert a door knob in a pot of boiling water, the deformable cover may instead be heated in water to a softened state, quickly removed, dried and installed on the knob and molded to the shape desired by the user. Depending on the situation, a light adhesive may be necessary to adequately bond the grip material to the door knob or to the handle. With a handle formed in accordance with the present invention, the necessary gripping force that needs to be exerted by the user to use an implement, or to turn a door knob, can be dramatically reduced.

While the invention is particularly helpful for those that are physically impaired, significant benefits are also noted by non-handicapped individuals who regularly use hand tools in their daily occupations. Carpenters, for example, may be required to swing a heavy hammer repeatedly for extended periods of time. While the objection of swinging a hammer is to strike a nail with a hammer head moving at a high velocity, the carpenter, in addition to merely lifting and then accelerating the hammer to strike the nail must exert a sufficient gripping force on the hammer handle to prevent the hammer from sliding from the carpenter's hand. By providing the high friction grip in accordance with the present invention, the gripping force necessary to hold the hammer can be significantly reduced, thereby minimizing fatigue and grip related injury. The use of one's hands repeatedly to grip tools in industrial environments frequently leads to a disease effecting the wrist, referred to as carpal tunnel syndrome. Severe cases of carpal tunnel syndrome requires surgery to remove growths from a patient's wrist region which effects tendon movement. Patients' use of their hands is severely limited post-surgery for extended periods of time. It is believed that hand tools formed in accordance with the present invention, not only will minimize injuries, but will enable patients having grip related injuries to return to the work force quicker. In addition, the angle of the grip on a particular tool can be easily changed by the individual user by adding or subtracting material as necessary to achieve a comfortable working position.

An alternative embodiment of the invention is shown in FIGS. 7 and 8, in which a grip is provided for a common pencil 24. The grip 26 is shown in the final molded shape. Initially the grip was a cylindrical, tubular member designed to telescope over the pencil. Like the hammer previously described, the grip is heated to a softened state in boiling water, and then squeezed by the user to deform the grip cover to the desired shape. Once again, it is advantageous to move the pencil in a manner in which it will ultimately be used, i.e., to write, during the cooling process so that the grip will be deformed in a manner which will not inhibit free movement. Unlike the hammer described previously, it is desirable to enable the grip on the pencil to slide axially so that the pencil may be sharpened. Holding the pencil in a normal manner naturally compresses the grip surface radially. When it is desired to slide the grip axially up the pencil to allow the pencil to be sharpened, the grip is pushed axially in the absence of any radial force. When held in a normal manner, however, there is sufficient deflection due to the radial forces exerted on the grip to prevent any axial relative movement therebetween. The grip shown in FIGS. 7 and 8 is specifically designed for elongated implements. The grip is formed of a tubular deformable cover and has a bore formed therethrough enabling the cover to be telescopically installed on the elongated implement. The cover should be heated to at least about 130° F. to cause it to be slightly elastic during initial installation.

Another embodiment of the tubular grip is intended to cooperate with an elongated implement shown in FIG. 9. A punch 28 is shown equipped with a tubular deformable grip cover 30 which has been heated and deformed to correspond in shape to a prosthetic hook 32. It is virtually impossible for a one-armed individual to use a hammer and chisel, or hammer and punch in an effective manner. Holding a conventional punch in a metal prosthetic hook is a difficult task as a result of the very poor coefficient of friction between the two hard metal surfaces. Upon striking the punch with a hammer, the punch invariably comes out of the grasp of the hook. With the tubular grip of the present invention installed on the punch, and molded to shape, a one-armed individual can use a hammer and punch with equal, if not better effectiveness, than a two-armed person.

Another task which is quite difficult for a one-armed individual to do is to hold and write on a clipboard. Holding a clipboard with a prosthetic hook or hand is extremely difficult due to the difficulty in gripping the hard, flat clipboard surface. By bonding a deformable grip pad to the marginal edge of a clipboard, and molding it to correspond in shape to the user's prosthetic hook, a clipboard can be easily and securely held without difficulty. It should be noted that it is not necessary to heat the deformable grip material in boiling water, particularly when molding the material to fit a prosthetic hook. The deformable grip material may be heated with a hair dryer or the like to the softening point of the material. Extreme care should be taken not to get the material too hot when molding to a user's skin. Therefore, it is desirable to use boiling water when possible, since the maximum temperature of the grip may be reliably controlled.

Another alternative embodiment of the invention is shown in FIG. 10. A prosthetic hook, similar to that in FIG. 9 is show. However, rather than putting the gripping material on the implement, grips 34 and 36 are affixed to hook members 38 and 40 respectively. Grips 34 and 36 may be slidably fitted to the hook member in a similar manner in which grip 26 is affixed to pencil 24 described previously. Alternatively, the grips may be bonded to the hook members using an adhesive, or attached using a mechanical fastener or other attachment means to securely retain the grip affixed to the hook members. With the grips properly fitted to the hook members, the grips may be heated and molded to fit a specific object. For example, if a one-armed individual is repeatedly picking up an object in a work environment, special grips can be fabricated to specifically hold that object. While there has been a great deal of emphasis on prosthetic hooks and mechanical hands for handicapped individuals, it should be noted that grips of the present invention, which are shown in FIG. 10, can also be used with mechanical hands used on industrial robots. One of the common problems associated with the use of industrial robots is their lack of versatility. While it might be very simple to reprogram a robot to do a different task, it is frequently necessary to fabricate new grippers for the mechanical robot hand, specifically adapted to hold the parts to be moved. Utilizing a gripper of the present invention, grip pads can be quickly fabricated to fit the specific contour of the part to be processed. It should also be noted that grips made specifically for robot applications may be provided with a threaded insert so that a mechanical threaded fastener, the type typically used on robot gripper pads, can be utilized.

Another feature of this invention is to provide the thermoplastic material in the shape of a spiral cut tube 42 such as shown in FIG. 11. The thermoplastic material, preferably a copolymer of ethylene and vinyl acetate (EVA), is heated and extruded under pressure through a die in an extrusion machine to form a solid tube. The dimensions of the tube can vary. For example, a tube having an inner diameter of about 0.615 inch and an outer diameter of 0.895 inch can be used to fit implement handles of ⅝" to 1-⅛". The tube is then spiral cut into an elongated helical strip. This can be accomplished by feeding the tube through a type of lathe having an internally directed rotating angled blade that cuts through the tube as it is fed through the tool. By angling the cut it is possible to provide an overlapping seam which helps in strength and appearance; it also help to form a seal to prevent moisture from entering the resultant grip. An angle of about 30 degrees on the cut edge 44 of the elongated helical strip 46 is preferred, although not absolutely necessary. The width of the strip 46 is typically on the order of 0.750 inch.

Figure 12:
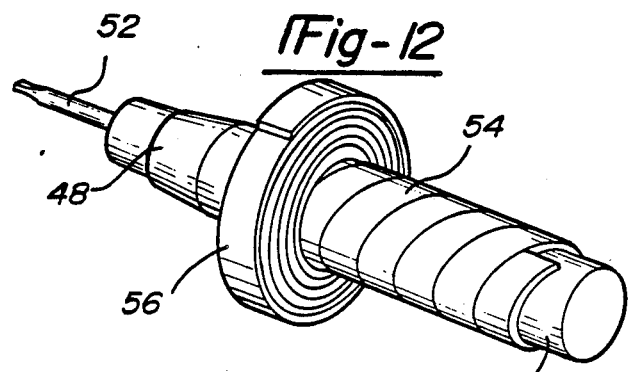
FIG. 12 is a view illustrating the spiral cut material being applied to a tool.

The provision of the thermoplastic material in the form of the spiral cut tube 42 makes it easy to form a grip around a variety of implements. In FIG. 12, an automated air driven screwdriver 48 is illustrated. This tool typically includes an elongated handle 50 which is suspended above a workpiece. The user grasps the handle 50 and carries the bit 52 downwardly to tighten a series of fasteners on the workpiece. The versatility of the spiral cut tube becomes evident since it is possible to provide not only a grip for the tool but also a stop.

In use, the spiral cut tube 42 is unfurled and wrapped around the handle 50. A single layer typically will suffice on that area 54 to serve as the grip. However, if a stop is additionally desired, the helical strips are overlapped on a plurality of layers to form a radially extending stop area 56. It may be necessary, in some instances, to apply a layer of suitable adhesive around the handle 50 to temporarily hold or tack the thermoplastic material in place. However, the spring tension provided by the material from the spiral cut tube helps to hold the material in place both in a radial and horizontal direction while the adhesive, if any, sets.

Figure 13:
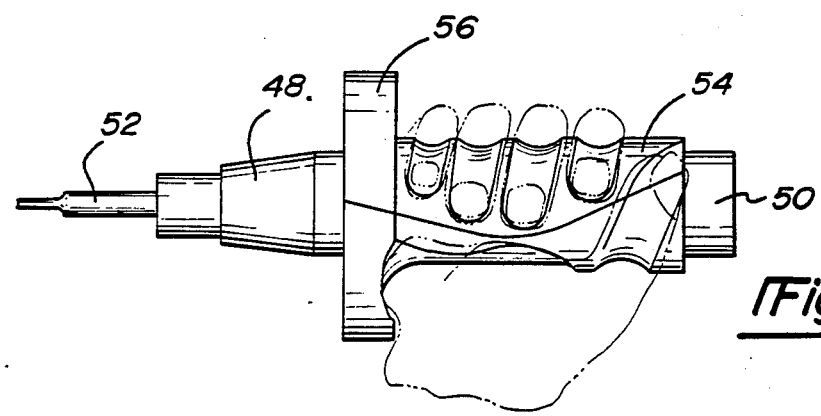
FIG. 13 is a view illustrating the tool after the grip has been molded.

Turning now to FIG. 13, the thermoplastic material is then heated to its softened, moldable state. Heating can be accomplished in a variety of manners. Where it is not convenient to dip the material into boiling water, the material can be heated by use of a conventional heat gun. Then the user grasps the grip portion 54 of the material and molds it into the shape of his or her grip. The indentations shown in FIG. 13 represent areas where fingers and the user's thumb have deformed the material into the shape of the user's grip. During heating, the thermoplastic layers in the stop portion 56 flow together to provide a generally unitary abutment for the hand when the tool is grasped and pulled downwardly toward the workpiece.

Figure 14:
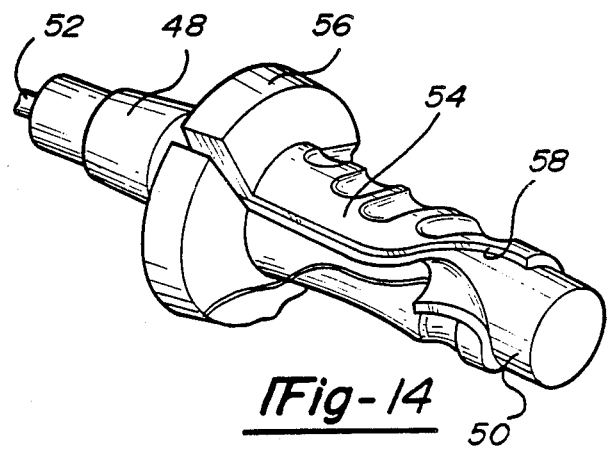
FIG. 14 is a view illustrating a grip after it has been cut and is in the process of being peeled off the tool.

In some instances it may be desirable or necessary for a number of different people to use the same tool. It is another feature of this invention that the molded grip can be easily removed, stored and later reinstalled onto the tool to permit others (with their own personalized grip) to use the tool. This would be particularly advantageous in the production line environment having multiple shifts where it is necessary for more than one worker to use the same tool. To remove the grip, a lubricated knife is used to form a cut 58 longitudinally down the formed grip. As shown in FIG. 13, the cut 58 preferably avoids as much area as possible where the user's hand comes into contact with the material. As can be seen in FIG. 14, the material is pliable enough so that it can be removed from the tool by peeling it away. Another user can then form his own personalized grip in the manner previously described. If his or her grip has already been formed, then it can be reinstalled onto the tool by wrapping it back around the handle 50. The molded material is sufficiently pliable that it should not crack under most circumstances and exhibits a high internal as well as external coefficient of friction. Thus, it can be removed and reinstalled onto the tool many times.

Figure 15:
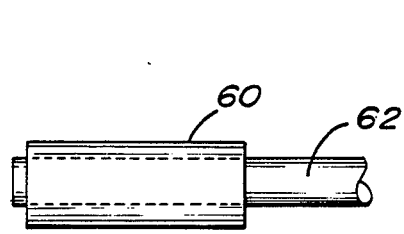
FIG. 15 is a view illustrating the thermoplastic material on a temporary carrier prior to molding.
Figure 16:
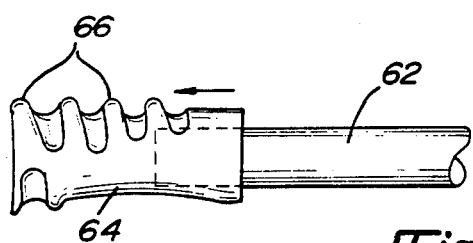
FIG. 16 is a view illustrating the molded grip being removed from the temporary carrier.

FIGS. 15 and 16 illustrate yet another feature of this invention. Although it is possible to use a heat gun to heat the thermoplastic material mounted on items such as electrical tools, bicycles, wheelbarrows and exercise equipment, it is possible to overheat the material. Sometimes the use of gloves during the molding process is necessary to prevent discomfort to the hand of the user. Of course, when gloves are used, the grip does not match the hand of the user as closely as would be case if the glove were not used during molding. The preferred method of heating the material is to immerse it in boiling water since this would prevent accidentally overheating the material and permit the user to directly grasp the material during molding. Unfortunately, it may not be possible to first apply the material to the implement and then dip the implement into boiling water. For example, it would be difficult to dip bicycle handle bar tubes or unwise to dip electrical tools into boiling water.

To overcome the problems noted above, the thermoplastic material 60 can be provided on a temporary carrier 62. As will appear, the shape of the temporary carrier 62 should closely approximate the shape of the implement to which the grip is ultimately installed. For example, if the grip is to be used on a handle bar tube then the outer diameter of the temporary carrier 62 should be the same as the outer diameter of the bicycle handle bar tube. The temporary carrier 62 should also be made of a material having relatively high melting point, at least considerably higher than the moldable temperature of the material 60 which is about 160° F. Since water boils at 212° F. and this is one method of heating the material, the temporary carrier should not soften at 212° F. The temporary carrier should also be made of a material that does not stick to the grip material 60 so that it can be easily removed after it is molded. While a variety of materials for the temporary carrier 62 should come to mind to the skilled practitioner, a polyethylene tubing could be used, as well as the use of core material which has been coated with a nonstick film such as Teflon or a mold release agent.

It is envisioned that the thermoplastic grip material 60 will be formed on the temporary carrier 62 by the manufacturer and then shipped to the user with molding and use instructions. The material 60 can be placed on the temporary carrier 62 by a variety of manners such as by injection molding the material around the carrier (without using slippery mold release agents) or by wrapping the spiral cut tube strips around the temporary carrier as in the manner discussed above. The material with its temporary carrier then can be shipped to the user. The user then immerses the material into boiling water, molds his hand impression into the material and the grip is allowed to cool. After cooling, the molded grip 64 is then slipped off of the temporary carrier 62 as shown in FIG. 16. The molded grip then can be installed onto the implement such as the bicycle handle bar tube.

It will be understood, of course, that while the form of the invention herein shown and described constitutes a preferred embodiment of the invention, it is not intended to illustrate all possible forms thereof. It will also be understood that the words used are words of description rather than of limitation, and that various changes may be made without departing from the spirit and scope of the invention disclosed.

What is claimed is:

1. A handle for an elongated implement to be held by the hand of a user comprising:
   a tubular deformable cover formed of a thermoplastic material which is stable and semi-rigid at normal ambient temperatures and is soft and deformable when heated, said cover consisting essentially of a copolymer of ethylene and vinyl acetate softening at a temperature in a range from above ambient temperature to the temperature of boiling water, said cover having a bore extending therethrough enabling the cover to be telescopically installed upon said implement, with the inner surface of the cover adhering to the implement and the outer surface of the cover being deformable when in the heated state to provide a contoured gripping surface unique to and directly grippable by the hand of a specific user.

2. The handle of claim 1 wherein said tubular deformable cover is slidable axially along said implement when the cover is not being loaded radially.

3. The handle of claim 2 wherein the implement is a pencil.

4. The handle of claim 3 wherein the thermoplastic material is grasped by the hand of a human.

5. A method of preventing cumulative trauma disorders in a hand at risk to such disorders, said method comprising:
   covering outer surface portions of an implement handle with a layer of thermoplastic material which is stable and semirigid at normal ambient temperatures and soft and deformable when heated in boiling water, said thermoplastic material being a copolymer of ethylene and vinyl acetate softening at a temperature in the range from above ambient temperature to the temperature of boiling water;
   heating the material until the cover is soft and deformable;
   grasping the thermoplastic material while the cover is soft and deformable thereby causing the cover to be molded to the user's hand; and
   directly gripping the molded cover when using the implement.

6. The method of claim 5 further comprising the moving of the implement handle during the grasping step so that the cover is molded in a shape to accommodate a range of implement movements.

7. The method of claim 5 wherein the step of covering the implement handle further comprises the following steps:
cutting a sheet of deformable thermoplastic material to a size corresponding to the periphery of the implement handle;
heating the deformable sheet to a softened state;
applying a layer of adhesive between the implement handle and the deformable material; and
deforming the material while softened.

8. A grip for attachment to opposing jaws of a mechanical hand designed to manipulate parts, said grip comprising:
a grip pad formed of a deformable thermoplastic material which is stable and semi-rigid at ambient temperatures and is soft and deformable when heated, the thermoplastic material being a copolymer of ethylene and vinyl acetate softening at a temperature in the range from above ambient temperature to the temperature of boiling water; and
attachment means for attaching said grip pad to a jaw of a mechanical hand, wherein said grip pad may be heated to a softened state, and molded into a contoured gripping shape by grasping the part to be manipulated by the mechanical hand.

9. In an apparatus having a structure with an outer surface to be gripped, the improvement comprising:
a deformable thermoplastic layer on the structure, said thermoplastic layer being a copolymer of ethylene and vinyl acetate softening at a temperature in the range of above ambient temperature to the temperature of boiling water, inner surfaces of the layer adhering to a portion of the outer surface of the structure and the outer surface of the thermoplastic layer being directly grippable, the material providing a sufficiently high coefficient of friction to thereby eliminate the need for additional high friction covers for the structure.

10. The apparatus according to claim 9 wherein said deformable thermoplastic layer is a spiral adapted to be positioned onto the structure.

11. The improvement of claim 9 wherein said thermoplastic layer is initially in the form of a tube having a bore with a diameter large enough so that the tube is slidable axially along the outer surface of the structure when the tube is not loaded radially.

12. The improvement of claim 11 wherein the structure is a pencil.

13. The improvement of claim 9 wherein outer surfaces of the thermoplastic layer have been deformed by a thing for gripping the structure, the material being substantially noncompressible resulting in indentations in the material where gripped and peaks above the original surface of the material adjacent to the gripped areas thereby increasing mechanical intervention, surface contact area and leverage when using the grip.

14. The improvement of claim 13 wherein the thing is a human hand.

15. The improvement of claim 9 wherein the thermoplastic layer surrounds the structure and is bonded thereto with an adhesive.

16. The improvement of claim 15 wherein the adhesive is a copolymer of ethylene and vinyl acetate.

17. A method of forming a grip for an implement, said method comprising:
forming a tube of moldable thermoplastic material being a copolymer of ethylene and vinyl acetate softening at a temperature in a range of above ambient temperature to the temperature of boiling water;
spiral cutting the tube into a helical strip; and
wrapping the strip around the implement to form a grip.

18. The method of claim 17 which further comprises:
heating the material to soften it;
molding the material while soft; and
allowing the material to cool to form a molded grip.

19. The method of claim 18 wherein the tube is formed by extruding the material.

20. The material of claim 19 which further comprises:
wrapping the helical strip around the implement so that a plurality of overlapping layers are provided on the implement to thereby form a stop adjacent molded portions of the material.

21. THe method of claim 18 which further comprises:
cutting the molded grip;
peeling the molded grip away from the implement;
molding a second grip for a second person;
removing the second grip; and
replacing the first grip onto the implement whereby the implement can be used by different users, each having their own moldable molded grip.

22. A method of making a grip for an implement having a given shape, said method comprising:
providing moldable, thermoplastic material being a copolymer of ethylene and vinyl acetate softening at a temperature in a range above ambient temperature to the temperature of boiling water on a temporary carrier having substantially the same configuration as the implement;
heating the thermoplastic material;
molding the thermoplastic material;
removing the molded thermoplastic material from the temporary carrier; and
installing the molded thermoplastic material onto the implement.

23. The method of claim 22 wherein said temporary carrier is made of material that will generally not stick to the thermoplastic material thereby enabling the molded thermoplastic material to be easily slipped off of the temporary carrier after molding.

24. The method of claim 23 wherein the heating step is carried out by dipping the thermoplastic material in boiling water while on the temporary carrier; and
wherein the molding step comprises grasping the heated thermoplastic material with a user's hand.

25. The method of claim 24 wherein said temporary carrier is made of polyethylene.

* * * * *